US012738027B2

(12) United States Patent
Watanabe et al.

(10) Patent No.: US 12,738,027 B2
(45) Date of Patent: Sep. 15, 2026

(54) IMAGE PROCESSING APPARATUS AND IMAGE PROCESSING METHOD FOR DETERMINING THE PRESENCE OR ABSENCE OF ABNORMALITIES IN PARTIAL IMAGES

(71) Applicant: CANON KABUSHIKI KAISHA, Tokyo (JP)

(72) Inventors: Keiji Watanabe, Kanagawa (JP); Hidekatsu Sugiyama, Kanagawa (JP); Keiji Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 534 days.

(21) Appl. No.: 17/683,065

(22) Filed: Feb. 28, 2022

(65) Prior Publication Data

US 2022/0292814 A1 Sep. 15, 2022

(30) Foreign Application Priority Data

Mar. 4, 2021 (JP) ................................ 2021-034666

(51) Int. Cl.
*G06V 10/774* (2022.01)
*G06T 7/00* (2017.01)

(52) U.S. Cl.
CPC .......... *G06V 10/774* (2022.01); *G06T 7/0004* (2013.01); *G06T 7/0012* (2013.01);
(Continued)

(58) Field of Classification Search
CPC ...... G06V 10/774; G06V 10/22; G06V 10/82; G06T 7/0004; G06T 7/0012;
(Continued)

(56) References Cited

U.S. PATENT DOCUMENTS 11,494,693 B2 * 11/2022 Pezzillo ................. G06N 5/048
2019/0057504 A1 * 2/2019 Kobayashi .......... G06F 18/2415
(Continued)

FOREIGN PATENT DOCUMENTS

CN 109916906 A * 6/2019 ....... G01N 21/95607
JP 2020087211 A 6/2020
(Continued)

OTHER PUBLICATIONS

Yi et al., "Patch SVDD: Patch-level SVDD for Anomaly Detection and Segmentation," arXiv, in Computing Research Repository (CoRR), 2020, vol. abs/2006.16067 [online]. [retrieved on Jul. 13, 2020]. Retrieved from the Internet <URL: https://arxiv.org/abs/2006.16067> (Year: 2020).*
(Continued)

*Primary Examiner* — Emily C Terrell
*Assistant Examiner* — Julia Z. Yao
(74) *Attorney, Agent, or Firm* — Canon U.S.A., Inc. IP Division

(57) ABSTRACT

An image processing apparatus applies a learning process to a learning model using training data generated from first original images obtained by capturing a subject of inspection. The apparatus then performs, using the learned learning model, deduction processing on input data generated from a second original image obtained by capturing a subject of inspection. The training data is generated using a plurality of partial images from each of the first original images, and the deduction process uses a partial image of the second original image as the input data. The detection rate of an abnormal portion having a small size included in images of the subject of inspection is thereby improved.

10 Claims, 14 Drawing Sheets

(52) U.S. Cl.
CPC ............... *G06T 2207/20021* (2013.01); *G06T 2207/20081* (2013.01)

(58) Field of Classification Search
CPC . G06T 2207/20021; G06T 2207/20081; G06T 2207/10016; G06T 2207/10088; G06T 2207/20076; G06T 2207/20084; G06T 2207/20132; G06T 2207/30061
See application file for complete search history.

(56) References Cited

U.S. PATENT DOCUMENTS

| | | | | |
|---|---|---|---|---|
| 2019/0287234 | A1* | 9/2019 | Panda | G06T 7/136 |
| 2019/0370686 | A1* | 12/2019 | Pezzillo | G06N 5/048 |
| 2020/0134384 | A1* | 4/2020 | Hino | G06V 10/82 |
| 2020/0226368 | A1* | 7/2020 | Bakalo | G06N 3/045 |
| 2020/0258230 | A1* | 8/2020 | Oi | G06N 3/08 |
| 2020/0349707 | A1* | 11/2020 | Hosseini | G06V 10/7788 |
| 2020/0410660 | A1* | 12/2020 | Tandia | G06V 10/82 |
| 2021/0065344 | A1* | 3/2021 | Hirai | G06T 7/001 |
| 2023/0118767 | A1* | 4/2023 | Konno | G06V 10/82 382/141 |

FOREIGN PATENT DOCUMENTS

| | | | | |
|---|---|---|---|---|
| JP | 2020112926 A | | 7/2020 | |
| WO | WO-2019240257 A1 | * | 12/2019 | A61B 3/0025 |

OTHER PUBLICATIONS

Li et al., "Detecting abnormal regions in colonoscopic images by patch-based classifier ensemble," Proceedings of the 17th International Conference on Pattern Recognition, 2004. ICPR 2004., Cambridge, UK, 2004, pp. 774-777 vol. 3, doi: 10.1109/ICPR.2004.1334643. (Year: 2004).*

Junya Ohno, et al., "Subjective Contour Extraction Using Deep Learning", Jun. 2016, pp. 12-17.

* cited by examiner

200
SERVER
MAIN BOARD
210
212
211
CPU
216
HARD DISK CONTROL CIRCUIT
202
HARD DISK UNIT
213
PROGRAM MEMORY
217
GPU
214
DATA MEMORY
215
NETWORK CONTROL CIRCUIT
201
NETWORK CONNECTION UNIT
104
NETWORK
505
LINE CONNECTION UNIT
503
502
WIRELESS LAN UNIT
500

TOUCH DISPLAY
504
NEAR FIELD COMMUNICATION UNIT
501

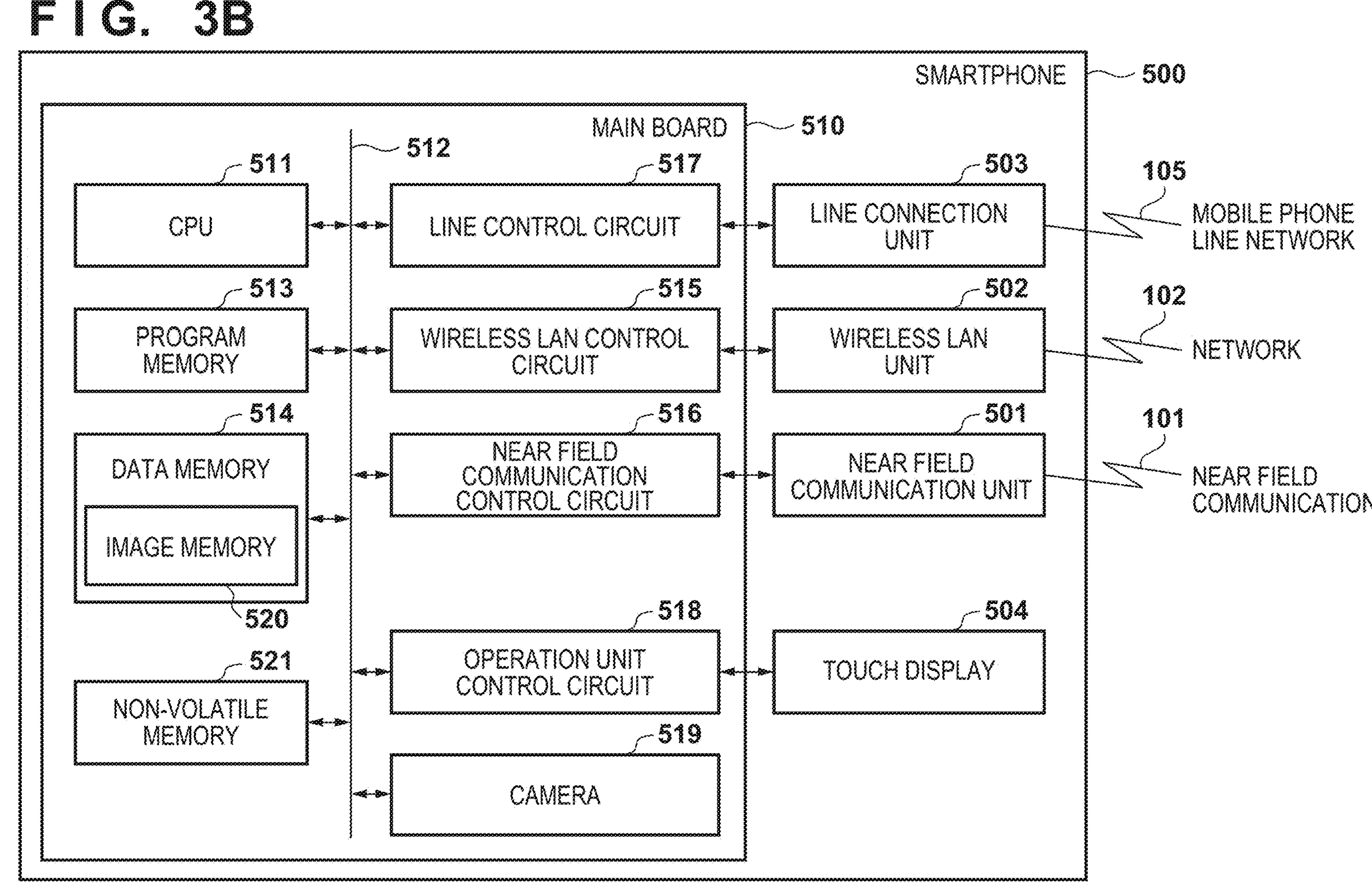
F I G. 3B
SMARTPHONE
500
MAIN BOARD
510
512
511
CPU
517
LINE CONTROL CIRCUIT
503
LINE CONNECTION UNIT
105
MOBILE PHONE LINE NETWORK
513
PROGRAM MEMORY
515
WIRELESS LAN CONTROL CIRCUIT
502
WIRELESS LAN UNIT
102
NETWORK
514
DATA MEMORY
IMAGE MEMORY
520
516
NEAR FIELD COMMUNICATION CONTROL CIRCUIT
501
NEAR FIELD COMMUNICATION UNIT
101
NEAR FIELD COMMUNICATION
518
OPERATION UNIT CONTROL CIRCUIT
504
TOUCH DISPLAY
521
NON-VOLATILE MEMORY
519
CAMERA

OVERALL EXTERNAL VIEW

UPPER PORTION PERSPECTIVE VIEW

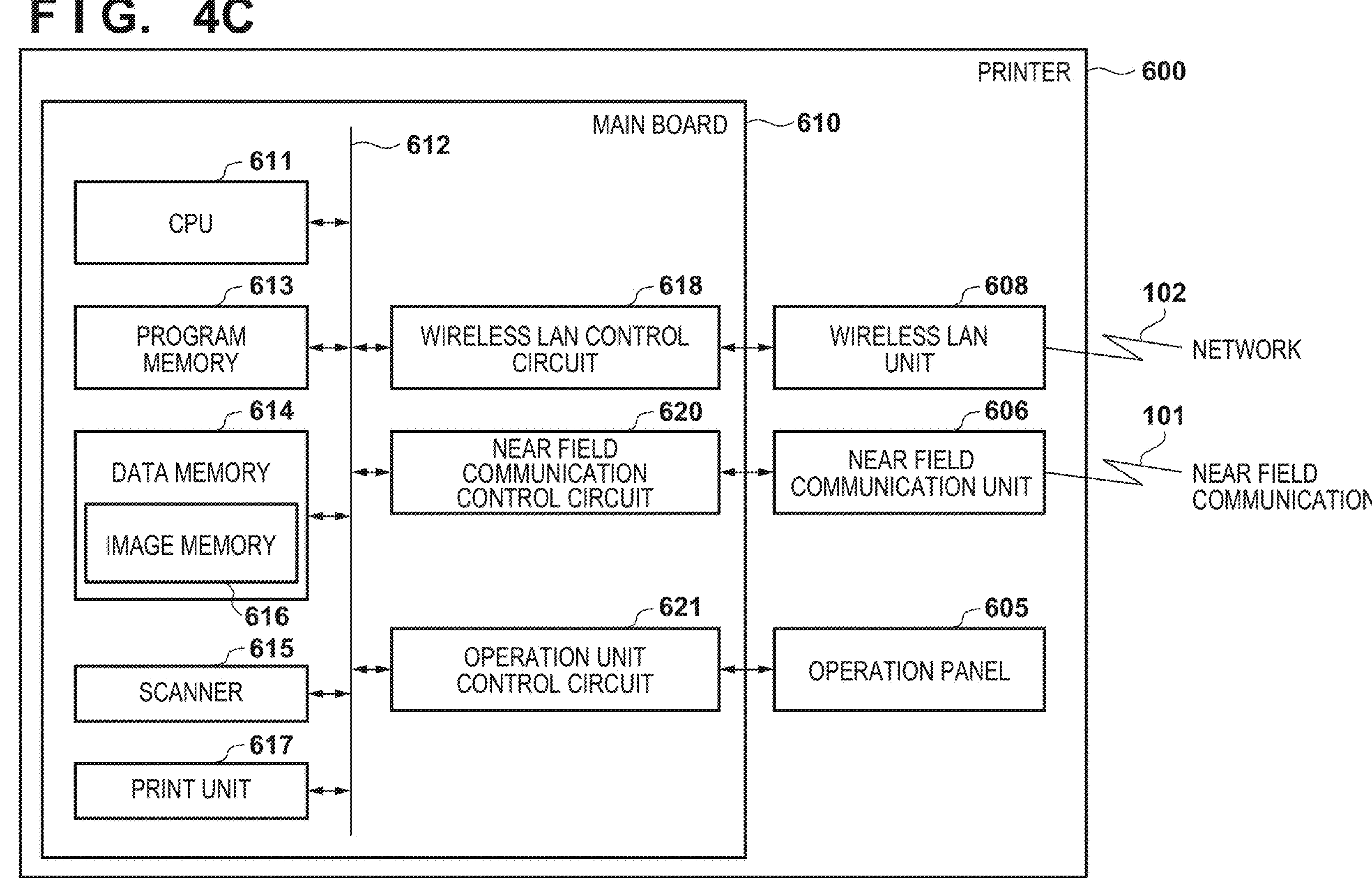
F I G. 4C
PRINTER
600
MAIN BOARD
610
612
611
CPU
613
PROGRAM MEMORY
618
WIRELESS LAN CONTROL CIRCUIT
608
WIRELESS LAN UNIT
102
NETWORK
614
DATA MEMORY
IMAGE MEMORY
616
620
NEAR FIELD COMMUNICATION CONTROL CIRCUIT
606
NEAR FIELD COMMUNICATION UNIT
101
NEAR FIELD COMMUNICATION
615
SCANNER
621
OPERATION UNIT CONTROL CIRCUIT
605
OPERATION PANEL
617
PRINT UNIT

FIG. 5

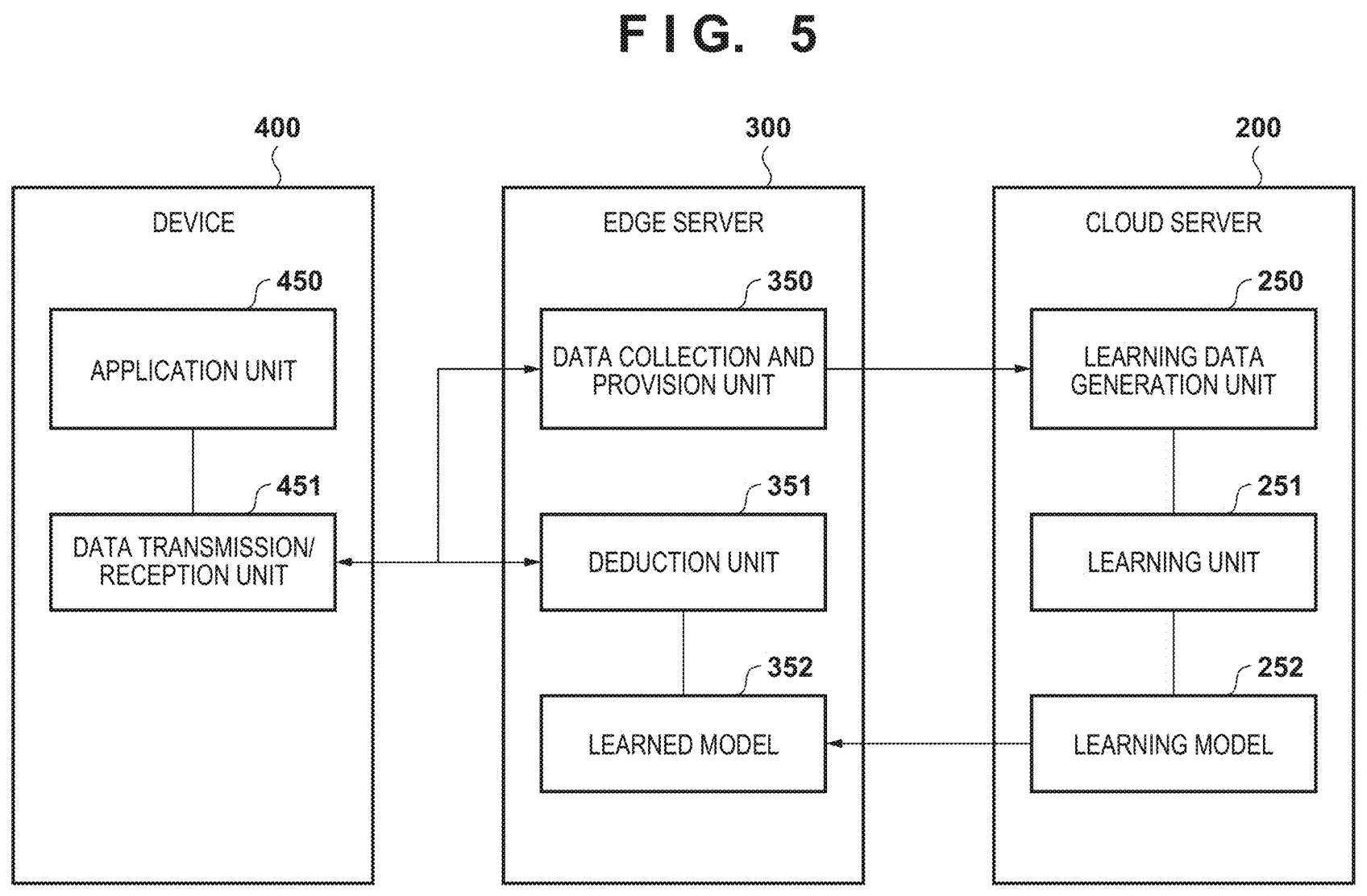

200 CLOUD SERVER

250 LEARNING DATA GENERATION UNIT

251 LEARNING UNIT

252 LEARNING MODEL

300 EDGE SERVER

350 DATA COLLECTION AND PROVISION UNIT

351 DEDUCTION UNIT

352 LEARNED MODEL

400 DEVICE

450 APPLICATION UNIT

451 DATA TRANSMISSION/ RECEPTION UNIT

F I G. 6A
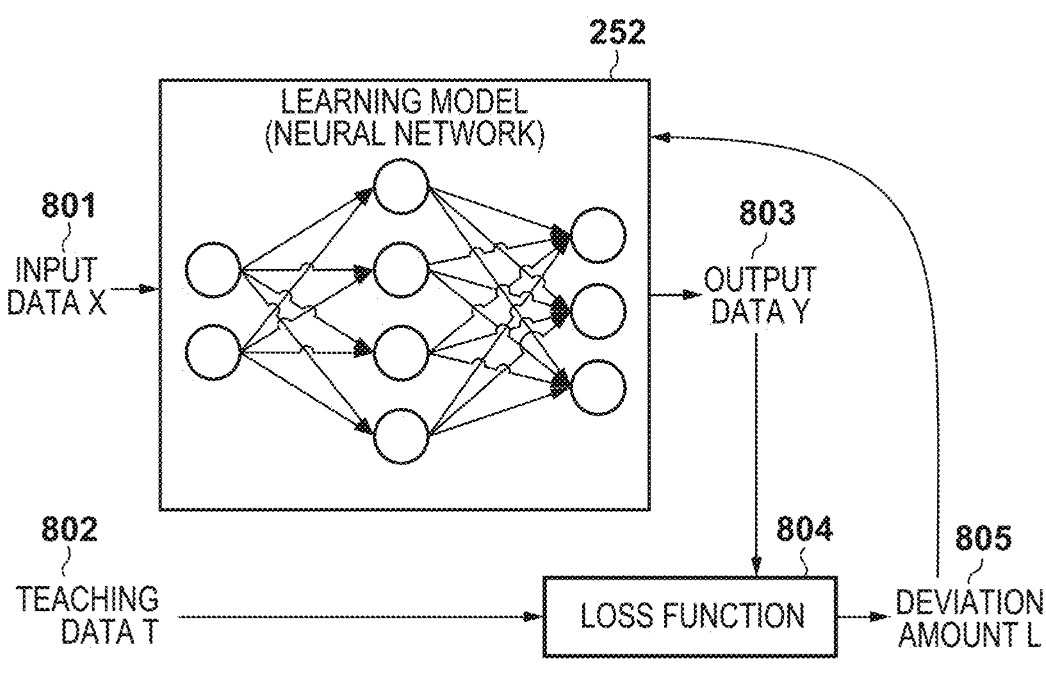
DURING LEARNING
F I G. 6B
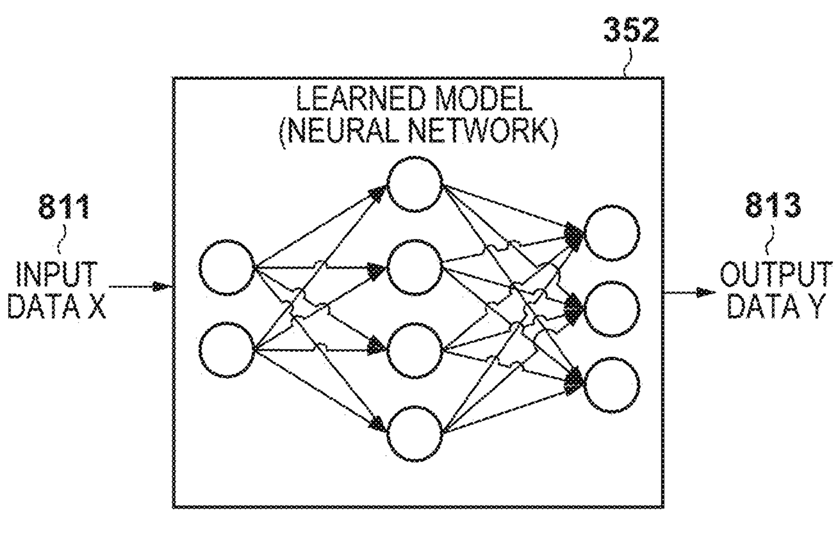
DURING DEDUCTION

900

IMAGE 1 IMAGE 2

IMAGE 3 IMAGE 4

ORIGINAL IMAGES

904

IMAGE CROPPING

CENTER

IMAGE 1 IMAGE 2

IMAGE 3 IMAGE 4

PRE-PROCESSING

900
ORIGINAL IMAGES
IMAGE 1
IMAGE 2
IMAGE 3
IMAGE 4
904
PRE-PROCESSING
IMAGE DIVISION
UPPER LEFT
LOWER LEFT
LOWER RIGHT
UPPER RIGHT
IMAGE 1
IMAGE 2
IMAGE 3
IMAGE 4

LOWER LEFT
UPPER LEFT
LOWER RIGHT
UPPER RIGHT
LEARNING
DEDUCTION
902
903
Class A
Class B
801
802
INPUT DATA
TEACHING DATA
252
LEARNING MODEL
352
LEARNED MODEL
811
INPUT DATA
904
TEST IMAGE
RESULT
RESULT
RESULT
RESULT

FIG. 14

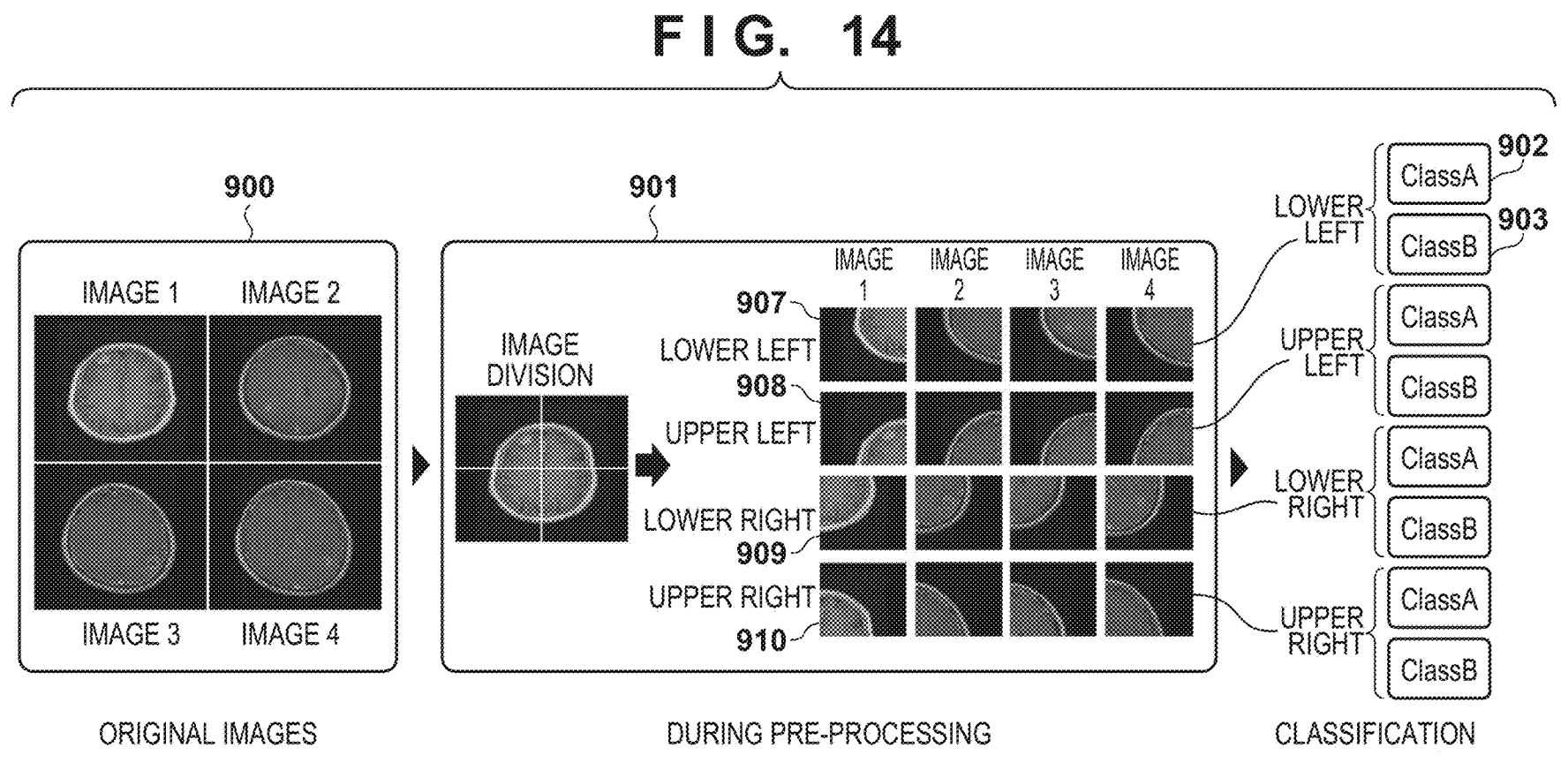

900
IMAGE 1
IMAGE 2
IMAGE 3
IMAGE 4
ORIGINAL IMAGES

901
IMAGE DIVISION
LOWER LEFT 907
UPPER LEFT 908
LOWER RIGHT 909
UPPER RIGHT 910
IMAGE 1
IMAGE 2
IMAGE 3
IMAGE 4
DURING PRE-PROCESSING

LOWER LEFT
UPPER LEFT
LOWER RIGHT
UPPER RIGHT
902 ClassA
903 ClassB
ClassA
ClassB
ClassA
ClassB
ClassA
ClassB
CLASSIFICATION

IMAGE PROCESSING APPARATUS AND IMAGE PROCESSING METHOD FOR DETERMINING THE PRESENCE OR ABSENCE OF ABNORMALITIES IN PARTIAL IMAGES

BACKGROUND

Field of the Disclosure

The present disclosure relates to an image processing apparatus and an image processing method.

Description of the Related Art

Image recognition (classification) using a machine learning model has come to be widely used as its performance improves. It is also known that, in order to improve the classification accuracy, the final classification is determined based on results obtained by separately performing classification using different machine learning models (Japanese Patent Laid-Open No 2020-112926).

On the other hand, for the conventional image processing apparatuses that use a machine learning model to detect an abnormal portion included in images obtained by capturing a subject of inspection, there has been the problem of a low detection rate for an abnormal portion having a small size.

SUMMARY

Some embodiments of the present disclosure, in one aspect thereof, improve the detection rate of an abnormal portion having a small size for an image processing apparatus and an image processing method that use a machine learning model to detect an abnormal portion included in images of a subject of inspection.

According to an aspect of some embodiments, there is provided an image processing apparatus comprising: one or more processors that execute a program stored in a memory and thereby function as: a generation unit configured to generate training data of a learning model from first original images obtained by capturing a subject of inspection; a learning unit configured to apply a learning process to the learning model using the training data; and a deduction unit configured to perform, using the learned learning model, deduction processing on input data generated from a second original image obtained by capturing a subject of inspection, wherein the generation unit generates a plurality of partial images from each of the first original images, and generates the training data using the plurality of partial images, and the deduction unit uses a partial image of the second original image as the input data.

According to another aspect of some embodiments, there is provided an image processing method performed by an image processing apparatus, comprising: generating training data of a learning model from each of first original images obtained by capturing a subject of inspection; applying a learning process to the learning model using the training data; and performing, on input data generated from a second original image obtained by capturing a subject of inspection, deduction processing using the learned learning model, wherein the generating includes: generating a plurality of partial images from each of the first original images; and generating the training data using the plurality of partial images, and, in the performing of deduction processing, a partial image of the second original image is used as the input data.

According to a further aspect of some embodiments, there is provided a non-transitory computer-readable storage medium storing a program for causing a computer to perform an image processing method comprising: generating training data of a learning model from each of first original images obtained by capturing a subject of inspection; applying a learning process to the learning model using the training data; and performing, on input data generated from a second original image obtained by capturing a subject of inspection, deduction processing using the learned learning model, wherein the generating includes: generating a plurality of partial images from each of the first original images; and generating the training data using the plurality of partial images, and, in the performing of deduction processing, a partial image of the second original image is used as the input data.

Further features of various embodiments will become apparent from the following description of exemplary embodiments (with reference to the attached drawings).

BRIEF DESCRIPTION OF THE DRAWINGS

FIG. 3B is a diagram showing an exemplary configuration of the smartphone 500.

FIG. 4C is a diagram showing an exemplary configuration of the printer 600.

FIG. 5 is a diagram showing a software configuration of the image processing system 100.

FIGS. 6A and 6B are conceptual diagrams showing input/output structures when using a learning model 252 and a learned model 352.

FIG. 14 is a diagram showing the details of test image processing in the third embodiment.

DESCRIPTION OF THE EMBODIMENTS

Figure 1:
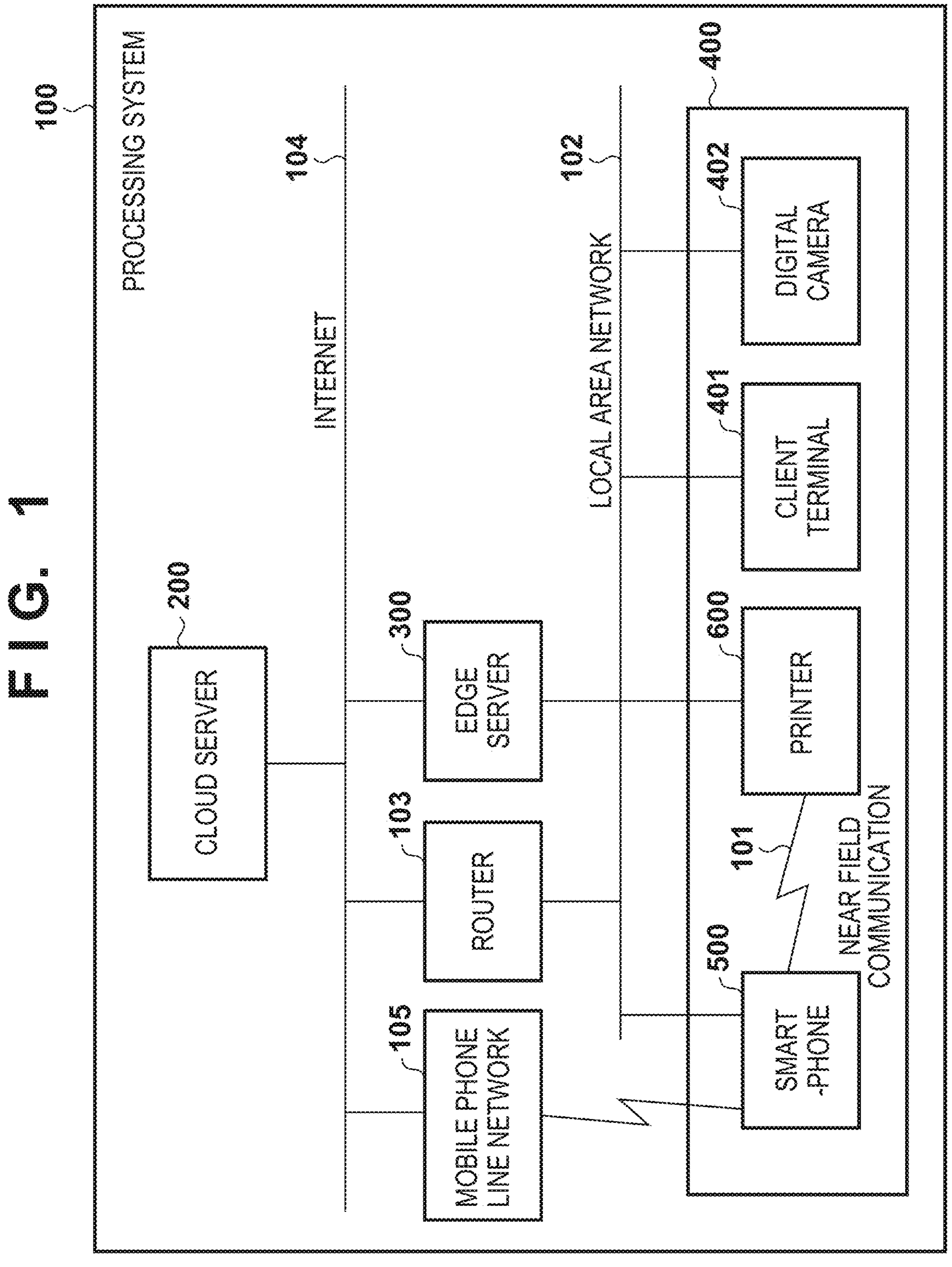
FIG. 1 is a diagram showing a configuration of an image processing system 100.

Hereinafter, embodiments will be described in detail with reference to the attached drawings. Note, the following embodiments are not intended to limit the scope of every embodiment. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

The following describes embodiments that are implemented in an image processing system in which a machine learning model is disposed in an external apparatus of an image processing apparatus, the image processing apparatus provides images to the external apparatus, and the external apparatus performs learning of the machine learning model, and recognition (classification) using a learned model. However, it is possible to adopt a configuration in which the image processing apparatus includes a machine learning model, and the image processing apparatus implements one or more embodiments.

First Embodiment

Configuration of Image Processing System

FIG. 1 is a block diagram showing an exemplary overall configuration of an image processing system 100 as an embodiment. The image processing system 100 has a configuration in which a cloud server 200, an edge server 300, and a device 400 are communicably connected to each other. Here, a description will be given of an exemplary configuration in which the cloud server 200 is present on the Internet, and the edge server 300 and the device 400 are present on a local area network (LAN) 102. However, the cloud server 200, the edge server 300, and the device 400 may be connected in any configuration. It is not essential that the cloud server 200 and the edge server 300 are provided separately, and the functions of the two servers may be performed using one server. Furthermore, the functions performed by the cloud server 200 and the edge server 300 may be performed by the device 400.

The device 400 is a generic term for electronic devices capable of communicating with the cloud server 200 and the edge server 300. In FIG. 1, a digital camera 402, a client terminal 401, a smartphone 500, and a printer 600 are shown as examples of the device 400. However, the device 400 may include any electronic device having a communication interface and capable of supplying image data. Note that the client terminal 401 is a computer device, such as a personal computer, a tablet terminal, and a game console. In the following, configurations and operations that are common to the digital camera 402, the client terminal 401, the smartphone 500, and the printer 600 will be described as the configuration and the operations of the device 400.

Note that a router 103 that connects the Internet 104 and the LAN 102 may be provided with the function of an access point of a wireless LAN. In this case, the device 400 can be connected to the LAN 102 through the access point provided by the router 103. For example, the printer 600 and the client terminal 401 can be configured to be connected to the LAN 102 via a wired connection, and the smartphone 500 and the digital camera 402 can be configured to be connected to the LAN 102 via a wireless connection. The device 400 and the edge server 300 can each communicate with the cloud server 200 by way of the Internet 104 connected via the router 103.

The edge server 300 and the device 400 can communicate with each other by way of the LAN 102. Also, the devices 400 can communicate with each other by way of the LAN 102. The smartphone 500 and the printer 600 can also communicate with each other through near field communication 101, in addition to communicating by way of the LAN 102. The near field communication 101 may be wireless communication in accordance with the Bluetooth (registered trademark) standard or the NFC standard, for example. The smartphone 500 is also connected to a mobile phone line network 105, and can also communicate with the cloud server 200 via the mobile phone line network 105.

The configuration shown in FIG. 1 is merely an example, and the image processing system 100 may have a different configuration. For example, a device other than the router 103 may function as an access point. The edge server 300 and the device 400 may be connected to each other via a configuration different from the LAN 102. For example, it is possible to adopt various configurations, such as wireless connections using a wireless access technique classified as LPWA (Low Power, Wide Area), ZigBee, Bluetooth, infrared communication, and the near field communication 101, and a wired connection, such as USB.

Configuration of Server

Figures 2, 3A:
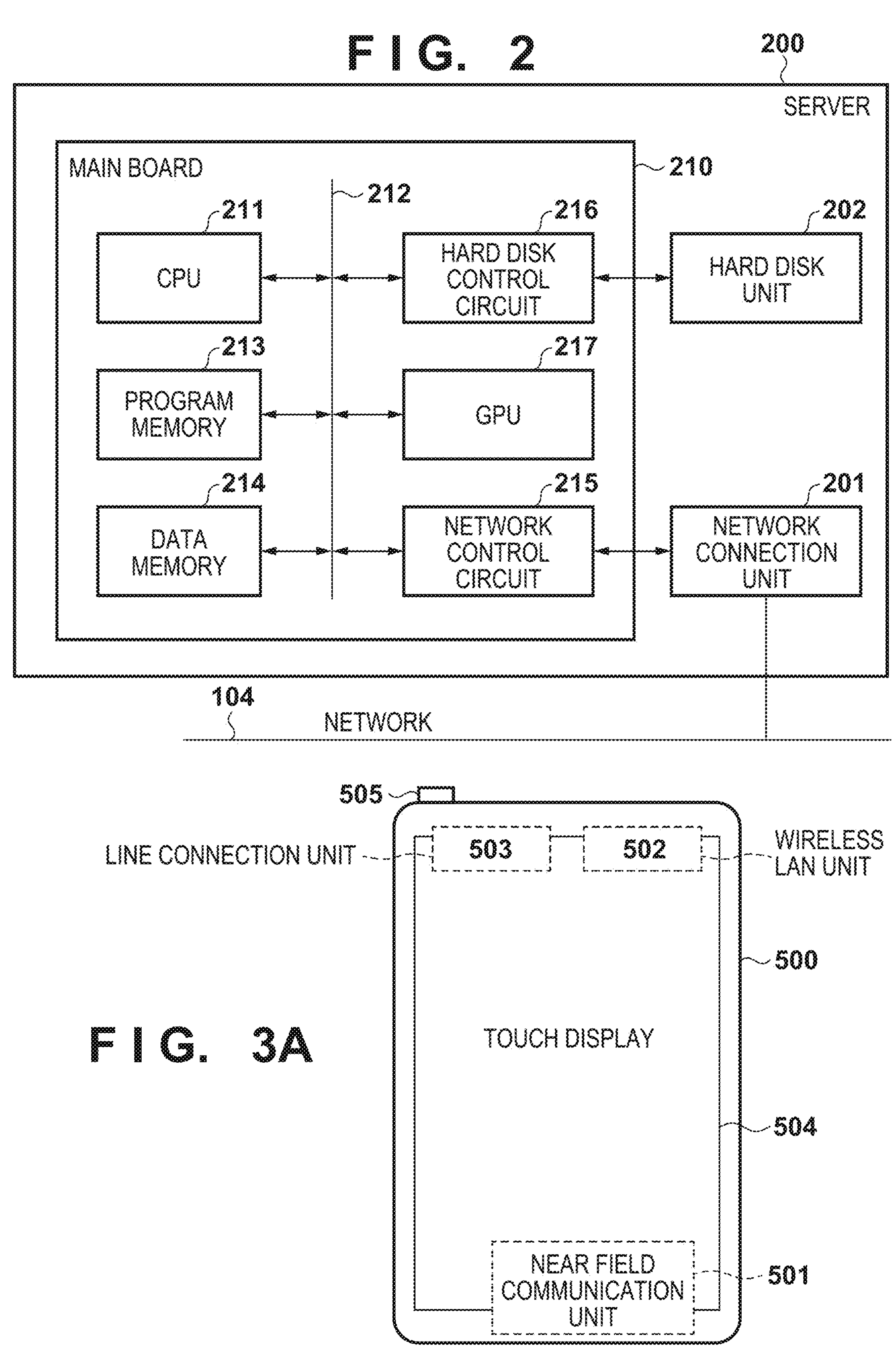
FIG. 2 is a block diagram showing a configuration of a cloud server 200 and an edge server 300.
FIG. 3A is a diagram showing an exemplary appearance of a smartphone 500.

FIG. 2 is a block diagram showing an exemplary configuration of the cloud server 200 and the edge server 300. Although the following describes the configuration of the cloud server 200, it is assumed that the edge server 300 has the same function.

The cloud server 200 includes a main board 210 that controls the device as a whole, a network connection unit 201, and a hard disk unit 202.

A CPU 211 disposed on the main board 210 operates in accordance with a control program stored in a program memory 213 (ROM) connected thereto via an internal bus 212, and settings, variables, and so forth that are stored in a data memory 214 (RAM). The CPU 211 controls the operation of the server 200 by executing the program.

The CPU 211 communicates with another device through networks, such as the Internet 104 and the LAN 102, by controlling the network connection unit 201 via the network control circuit 215. Also, the CPU 211 can write data into the hard disk unit 202 connected thereto via a hard disk control circuit 216, and read data from the hard disk unit 202.

The hard disk unit 202 stores an operating system that is loaded onto the program memory 213 and executed by the CPU 211, control software of the server 200, application software, various types of data, and so forth.

A GPU 217 is connected to the internal bus 212 of the main board 210. The GPU 217 can execute various types of computing processing on behalf of the CPU 211. Since the GPU 217 can execute parallel processing at high speed, computing for learning a neural network by a method such as deep learning, and computing for deduction using a learned model can be efficiently executed by the CPU 211. In the present embodiment, the processing of a learning unit 251 described below is performed using the GPU 217, in addition to the CPU 211. Specifically, the implementation and the learning of a machine learning model are realized by the CPU 211 and the GPU 217 executing computing in cooperation with each other. Note that the processing of the learning unit 251 may be performed using only one of the CPU 211 and the GPU 217. As in the case of the learning unit 251, the processing of the deduction unit 351 can also be performed using the GPU 217.

Although the edge server 300 has the same configuration as that of the cloud server 200 in the present embodiment, the edge server 300 may have a different configuration. For example, the main board 210 of the edge server 300 need not be equipped with the GPU 217. The components having the same name may have different functions between the cloud server 200 and the edge server 300.

Appearance of Smartphone 500

FIG. 3A is a diagram showing an exemplary appearance of a display surface of the smartphone 500 as viewed from the front, and exemplary communication units of the smartphone 500. The smartphone 500 is a generic term for mobile phones including a touch display, a camera, and the function of connecting to a data network, such as the Internet, and capable of executing various applications on an OS.

A near field communication unit 501 can communicate with a near field communication unit of another device present within a communication range. A wireless LAN unit 502 can communicate with an access point of a wireless LAN and a wireless LAN unit of another device that are present within a communication range. A line connection unit 503 can connect to and communicate with a mobile phone line network. These communication units are contained in a casing of the smartphone 500, and perform communication through an antenna provided on the surface or the like of the casing.

A touch display 504 is an LCD including a touch panel or an organic EL display panel, for example. It is assumed that the surface of the touch display 504 on which a display screen is present is the front surface of the smartphone 500. Upon detection of a touch operation performed on the touch display 504, the smartphone 500 interprets the touch operation according to the content displayed on the touch display 504, and performs various operations. A power button 505 is a button for turning the power of the smartphone 500 on or off.

Configuration of Smartphone

FIG. 3B is a block diagram showing an exemplary configuration of the smartphone 500. The smartphone 500 includes a main board 510 that controls the device as a whole, the wireless LAN unit 502, the near field communication unit 501, and the line connection unit 503.

A CPU 511 disposed on the main board 510 operates in accordance with a control program stored in a program memory 513 (ROM) connected thereto via an internal bus 512, and settings, variables, and so forth stored in a data memory 514 (RAM). The CPU 511 controls the operation of the smartphone 500 by executing the program.

The CPU 511 can communicate with an access point of a wireless LAN and a wireless LAN unit of another device that are present within a communication range by controlling the wireless LAN unit 502 via a wireless LAN control circuit 515. The CPU 511 can detect another near field communication terminal present within a communication range, and transmit and receive data to and from another near field communication terminal by controlling the near field communication unit 501 via a near field communication control circuit 516. In addition, the CPU 511 can connect to the mobile phone line network 105 and transmit and receive sound and data by controlling the line connection unit 503 via a line control circuit 517. The CPU 511 can control the content displayed on the touch display 504 and detect a touch operation by controlling an operation unit control circuit 518.

The CPU 511 can capture still images and moving images by controlling a camera unit 519. The CPU 511 stores image data that has been obtained through capturing in an image memory 520 in the data memory 514. The CPU 511 can also store, in the image memory 520, image data that has been obtained from the outside through the mobile phone line network 105, the LAN 102, and the near field communication 101, and can transmit, to the outside, the image data stored in the image memory 520.

A non-volatile memory 521 holds data even when the power is turned off. Accordingly, user data, such as contacts, a communication history, and image data to be saved, application software, and the like, are stored in the non-volatile memory 521.

Appearance of Printer

Figure 4A:
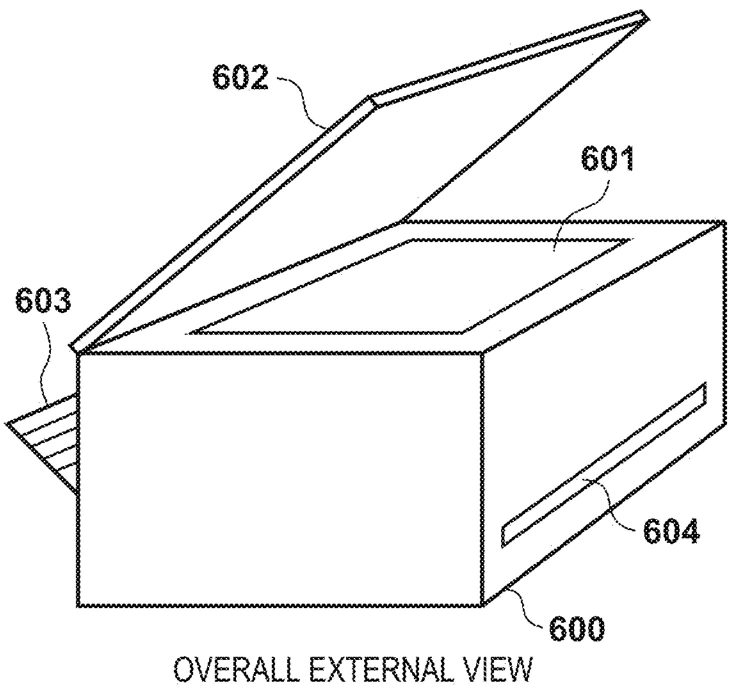
FIGS. 4A and 4B are diagrams showing an exemplary appearance of a printer 600.
Figure 4B:
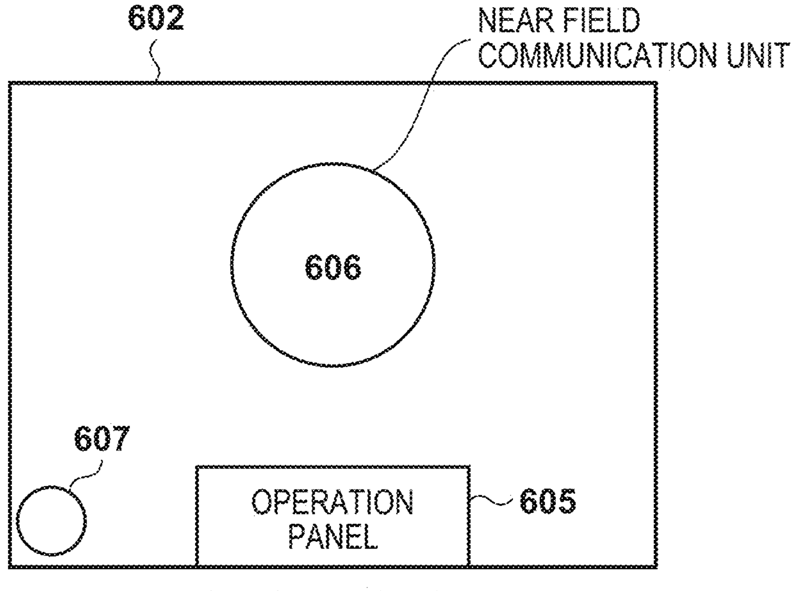

FIGS. 4A and 4B are diagrams showing an exemplary appearance of the printer 600. In the present embodiment, it is assumed that the printer 600 is a printer called a multifunction peripheral or a multifunction printer (MFP), which includes a scanner. FIG. 4A is a perspective view showing an exemplary appearance of the printer 600. A document platen 601 is formed of a transparent material, such as glass, and serves as a place where a document to be read is placed. A document platen pressing plate 602 is openable and closable, and, in the closed state, presses the document platen 601 and shields the document platen 601 from light. Recording media of various sizes set at a print sheet insertion port 603 are transported sheet by sheet during printing, and are discharged from a print sheet discharge port 604 through a print unit.

FIG. 4B schematically shows an exemplary appearance of an upper surface of the printer 600, and a communication unit of the printer 600. An operation panel 605 and a near field communication unit 606 are provided on a top surface of the document platen pressing plate 602. The near field communication unit 606 can communicate with a near field communication unit of another device present within a communication range. A wireless LAN antenna 607 is connected to a wireless LAN unit (not shown), and allows the printer 600 to communicate with an access point of a wireless LAN and a wireless LAN unit of another device that are present within a communication range.

Configuration of Printer

FIG. 4C is a block diagram showing an exemplary configuration of the printer 600. The printer 600 includes a main board 610 that controls the device as a whole, a wireless LAN unit 608, and a near field communication unit 606.

A CPU 611 disposed on the main board 610 operates in accordance with a control program stored in a program memory 613 (ROM) connected thereto via an internal bus 612, and settings, variables, and so forth stored in a data memory 614 (RAM). The CPU 611 controls the operation of the printer 600 by executing the program.

The CPU 611 controls the scanner unit 615 to read a document, and stores the read image data in an image memory 616 within the data memory 614. The CPU 611 can control the print unit 317 to print, on a recording medium, the image in the image memory 616 within in the data memory 614.

The CPU 611 can communicate with an access point of a wireless LAN and a wireless LAN unit of another device that are present within a communication range by controlling the wireless LAN unit 608 via a wireless LAN control circuit 618. The CPU 611 can detect another near field communication terminal present within a communication range, and transmit and receive data to and from another near field communication terminal by controlling the near field communication unit 606 via a near field communication control circuit 620.

The CPU 611 can display, on the operation panel 605, the state of the printer 600 and a menu screen, and detect an operation performed on the operation panel 605 by controlling an operation unit control circuit 621. The operation panel 605 is provided with backlighting, and the CPU 611 can control the turning on and off of the backlighting via the operation unit control circuit 621.

Software Configuration

FIG. 5 is a diagram showing an exemplary software configuration of the image processing system 100. For the ease of illustration and understanding, FIG. 5 only shows, out of pieces of software operating in the image processing system 100, those necessary for the illustration of the present embodiment, namely, pieces of software related to learning processing and deduction processing. For example, an operating system, middleware, an application for maintenance, and the like are not shown in the drawing.

The cloud server 200 includes a learning data generation unit 250, a learning unit 251, and a learning model 252. The learning data generation unit 250 is a module that generates training data of the learning model 252 from data received from the outside. The training data includes input data X, and teaching data T indicating a correct answer of the result of learning performed on the input data X. The learning data generation unit 250 supplies the generated training data to the learning unit 251.

The learning unit 251 is a program module that performs learning of the learning model 252 using the training data generated by the learning data generation unit 250. The learning model 252 accumulates results of the learning performed by the learning unit 251. Here, it is assumed that the learning model 252 is implemented using a neural network. By using the training data and optimizing weighting parameters between nodes of the neural network by a known method, the learning of the learning model 252 is performed.

The learning model 252 (learned model) for which the optimization (learning) of the parameters has been completed is supplied from the cloud server 200 to the edge server 300, and is held in the edge server 300 as a learned model 352. Note that the whole of the learning model 252 may be supplied to the edge server 300, or only a portion of the learning model 252 that is necessary for the deduction processing performed in the edge server 300 may be supplied to the edge server 300. The edge server 300 can perform classification of the input data using the learned model 352, and perform deduction processing such as numerical estimation (regression) based on the input data.

The edge server 300 includes a data collection and provision unit 350, a deduction unit 351, and the learned model 352. The data collection and provision unit 350 is a module that transmits the data received from the device 400 and the data that the edge server 300 has collected by itself to the cloud server 200 as data for generating the training data. The deduction unit 351 is a program module that supplies the input data based on the data received from the device 400 to the learned model 352 to perform deduction processing, and returns an output of the learned model 352 to the device 400.

The device 400 includes an application unit 450 and a data transmission/reception unit 451. The application unit 450 is a module that implements various types of functions in the device 400. Here, it is assumed that an application module included in the application unit 450 uses the learned model 352 of the edge server 300.

The data transmission/reception unit 451 transmits, to the data collection and provision unit 350 of the edge server 300, data used for learning of the learning model 252, out of the data obtained in the device 400. The data transmission/reception unit 451 transmits, to the deduction unit 351 of the edge server 300, data used for deduction processing, out of the data obtained or generated in the device 400. Upon receiving a result of the deduction processing from the deduction unit 351 of the edge server 300, the data transmission/reception unit 451 supplies the result to the application module requesting the deduction processing.

Note that the present embodiment has shown a configuration in which the learning model 252 that has been learned in the cloud server 200 is supplied to the edge server 300, and is used for the deduction processing performed in the edge server 300. However, the location where the learning model is provided and the location where the processing using the learned model is performed may be changed. For example, the learning model may be implemented in the device 400, and the learning of the learning model and the deduction processing using the learning model may also be performed in the device 400. For example, whether or not to dispose the learning model in the device 400 can be determined based on the relationship between the processing speed required for computing related to the learning model or the magnitude of power consumption thereof and the hardware resource of the device 400. Then, if it is not possible or desirable to dispose the learning model in the device 400, the learning model is disposed in an external apparatus.

When the learning model is disposed in an external apparatus, disposing the learning model in an external apparatus located on the same network as the device 400 can reduce the time required to obtain a result of deduction processing than disposing the learning model in any of external apparatuses located on a different network.

In the present embodiment, learning using a large amount of input data is performed in the cloud server 200 having higher processing capability than the edge server 300, and deduction processing is performed in the edge server 300. The communication time required for deduction processing can be reduced by performing deduction processing in the edge server 300.

When learning and deduction processing are performed in different entities, it is possible to adopt configurations suitable for the respective types of processing, and it is therefore possible to save the resource and use configurations that can perform the processing at higher speed. Note that the location where the learning model is provided and the location where learning using the learned model may be changed dynamically according to the state of the network, for example. For example, deduction processing may be performed in the edge server 300 in a normal state, but deduction processing may be performed in the cloud server 200 when the load on the edge server 300 is high.

Learning Model

FIGS. 6A and 6B are diagrams schematically showing learning processing of the learning model 252 and deduction processing using the learned model 352.

FIG. 6A is a diagram schematically showing input/output data of the learning model 252 in the learning processing and a method of learning. Input data X 801 is supplied to an input layer of the learning model 252. The details of the input data X 801 will be described later.

As a result obtained by processing the input data X 801 using the learning model 252, which is a machine learning model, is output as output data Y 803. During learning, teaching data T 802 is supplied as correct answer data for the processing performed on the input data X 801. Accordingly, a deviation amount L 805 of the processing result for the correct answer (teaching data) can be obtained by supplying the output data Y 803 and the teaching data T 802 to a loss function 804. For a large number of pieces of training data, combined-weighting coefficients or the like between nodes of a neural network constituting the learning model 252 are updated such that the deviation amount L 805 approaches zero. Backpropagation is an example of the method for optimizing the combined-weighting coefficients or the like between the nodes of a neural network such that the deviation amount L 805 becomes smaller.

Specific examples of the machine learning algorithms include a nearest neighbor algorithm, a Naive Bayes algorithm, decision trees, and a support vector machine. There is also known deep learning and deep metric learning in which feature amounts and combined-weighting coefficients for learning are self-generated using a neural network. In the present embodiment, any suitable algorithm of those known algorithms can be used as appropriate, taking the use and the like of machine learning into account. The method for implementing the learning model 252 is not particularly limited. The learning model 252 can be implemented using, for example, a convolutional neural network (CNN), a recurrent neural network (RNN), an autoencoder, a generative adversarial network (GAN), or the like.

FIG. 6B is a diagram showing input/output data of the learned model 352 in deduction processing. Input data X 811 is supplied to an input layer of the learned model 352. The details of the input data X 811 will be described later. The input data X 811 is in the same form as the input data X 801 used during learning, but has no corresponding teaching data.

Output data Y 813 is output as a result obtained by processing the input data X 811 using the learned model 352. In deduction processing, the output data Y 813 is returned to the device 400 as a processing result. The learned model 352 may be implemented using a neural network having the same configuration as that of the learning model 252, or may include only a portion of the learning model 252 that is necessary for deduction processing as the learned model 352. By forming the learned model 352 with fewer components than the learning model 252, it is possible to reduce the data amount of the learned model 352, or reduce the computing time during deduction processing.

Figure 7:
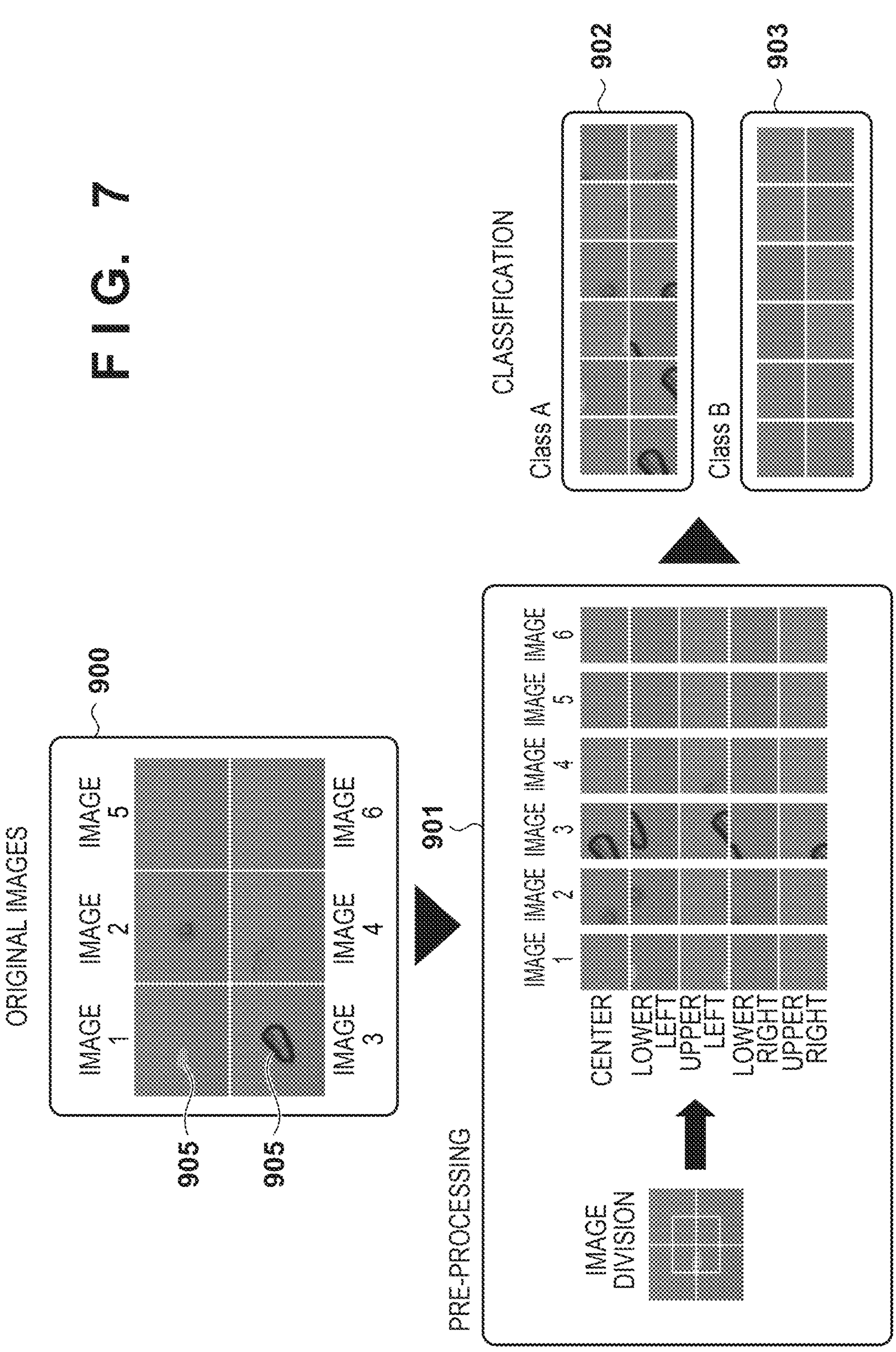
FIG. 7 is a diagram showing the details of processing performed before learning in a first embodiment.

FIG. 7 shows a specific example of training data applied to the learning model 252 when detecting an abnormality from inspection images of a semiconductor substrate by using the image processing system 100. It is assumed that original images (original image data) 900 used for training data constitute image data obtained by capturing the surface of a semiconductor substrate, and an abnormal portion 905 is located at a central portion of each image.

The resolution of the original image data 900 is 224×224 pixels, and the horizontal and vertical sizes of the abnormal portion 905 are several pixels to several tens of pixels. In a semiconductor process, even an extremely small abnormality on the substrate surface may cause a malfunction. In addition, a semiconductor substrate may be warped, or irregularities due to an abnormal portion may be present on the surface thereof. For this reason, a lens having a large depth of focus (e.g., 5 μm or more) is used for capturing inspection images such that clear images can be obtained over the entire capturing range.

In the present embodiment, a plurality of partial images (partial image data) 901 extracted from the original image data 900 are used for learning, rather than directly using the original image data 900 for learning. Specifically, data containing four partial images obtained by equally dividing each original image into two in each of the horizontal and vertical directions, and one partial image having the same size as that of each of the four partial images and having been extracted from a central portion of the original image is used for learning. The center of the partial image extracted from the central portion coincides with the center of the original image. In FIG. 7, this image extraction processing is denoted as pre-processing. In addition, the four partial images obtained by the equal division are denoted as lower left, upper left, lower right, and upper right, and the one partial image extracted from the central portion is denoted as center.

In the present embodiment, five pieces of partial image data 901 of 112×112 pixels are generated from the original image data 900 of 224×224 pixels through pre-processing. Through pre-processing, each of the lower left, upper left, lower right, and upper right partial images becomes an image in which an abnormal portion is present at a position away from the center of the image. By generating the partial images, the positions of abnormal portions within the image can be dispersed. In addition, the proportion (area ratio) of the abnormal portion in the image can be increased. Furthermore, learning can be performed using a larger number of images than when the entire region of each original image is used as a unit for learning. Specifically, in the example shown in FIG. 7, learning can be performed using a number of images that is five times the number of original images.

Here, through deduction processing using the learned model 352, input data is classified into data containing an abnormality and data containing no abnormality. Accordingly, a correct classification for each individual partial image is prepared as teaching data. Specifically, as shown in FIG. 7, the teaching data was generated by classifying the partial images (data) 901, through visual checking performed by a person, such that images 902 in which an abnormality to be recognized is present are classified as class A, and (normal) images 903 in which an abnormality to be recognized is not present are classified as class B.

Here, for the ease of illustration and understanding, the input data is described as being classified into two classes through deduction processing. However, the input data may be classified into three or more classes. The classes may be defined according to the criteria other than the presence or absence of an abnormality to be recognized. The teaching data may be generated by a method other than visual checking. For example, a simple learning model based on visually checked images may be created, and teaching data for partial images may be generated using the simple learning model.

Figures 8, 9:
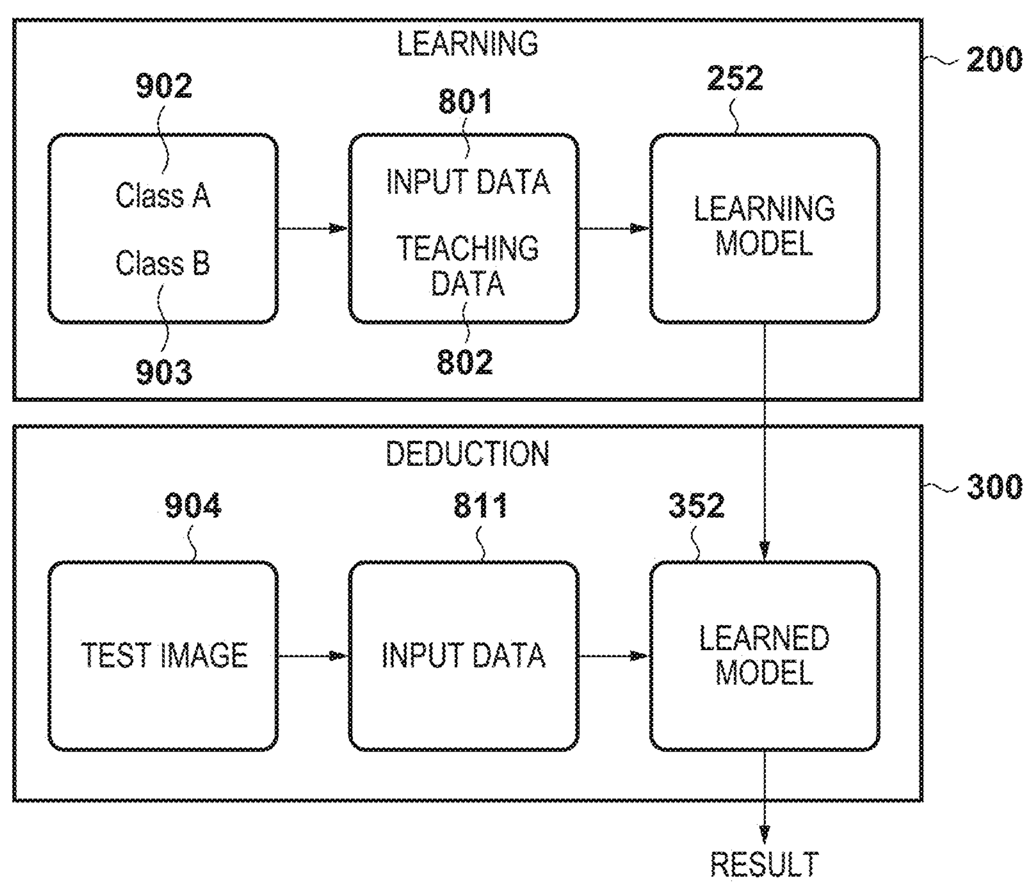
FIG. 8 is a diagram showing configurations used during learning and deduction in the first embodiment.
FIG. 9 is a diagram showing the details of test image processing in the first embodiment.

FIG. 8 is a diagram schematically showing a flow of learning processing and deduction processing performed in the image processing system 100 according to the present embodiment, and associated data. The class-A images 902 in which an abnormality to be recognized is present, and the (normal) class-B images 903 in which an abnormality to be recognized is not present, which have been descried with reference to FIG. 7, are supplied from the device 400 to the learning data generation unit 250 by way of the edge server 300. In the case of generating teaching data based on visual checking, the teaching data is also supplied from the device 400 to the learning data generation unit 250.

The learning data generation unit 250 generates input data 801 and teaching data 802 as training data from the class-A images 902 and the class-B images 903, and supplies the training data to the learning unit 251. When teaching data is supplied together with images, the learning data generation unit 250 may use the supplied teaching data. The learning unit 251 performs learning of the learning model 252 using the training data, and ends the learning when the deviation amount L indicated by the loss function falls below a predetermined threshold. At this time, the learning model 252 becomes a learned model. Then, a whole or part of the learning model 252 is supplied to the edge server 300, and is saved as the learned model 352.

Thereafter, test images 904 are supplied to the learned model 352 as input data 811, and the determined classes are obtained as output data. Note that the test images 904 have the same size (112×112 pixels) as the input data 801 used for learning, but are generated from the original images by a different method.

FIG. 9 shows examples of original images 900 for determining the presence or absence of an abnormality using the learned model 352, and pre-processing applied to the original images 900. The data transmission/reception unit 451 of the device 400 transmits the original images 900 (second original images) to the data collection and provision unit 350 and the deduction unit 351 of the edge server 300. The deduction unit 351 generates test images 904 from the original images 900, and supplies the test images 904 to the learned model 352 as the input data 811.

For each of the original images 900, the deduction unit 351 applies pre-processing in which a test image 904 of 112×112 pixels is generated by cropping a central portion of the original image 900 such that the center of the test image 904 coincides with the center of the original image 900. As a result of cropping, the position of an abnormality in the test image 904 may be located at a peripheral portion of the image, as in the case of an image 3. However, the learned model 352 has been learned using the input data containing an image in which an abnormality is present at a peripheral portion, and it is therefore possible to perform accurate determination for a test image, such as the image 3.

The machine learning-related configurations of the edge server 300 and the cloud server 200 that perform the processing shown in FIG. 8 can be implemented using, for example, Keras as a learning library, and TensorFlow as a backend of Keras. However, other backends may be used. The above-described configurations can also be implemented using, for example, any other known machine learning framework, such as TensorFlow, Caffe, Chainer, Pytorch, HALCON, and VisionPro Vidi, which may be either open source or commercially available. The above-described configurations may be implemented without using any ready-made framework.

Using the learned model according to the present embodiment, and a learned model that has been learned by a conventional method in which original images are directly used, the determination accuracies thereof were compared. As a result, it was confirmed that the learned model according to the present embodiment has a higher determination accuracy.

Second Embodiment

Next, a second embodiment will be described. Note that the present embodiment can be implemented in the image processing system 100 described in the first embodiment, and therefore the descriptions of details common to the first embodiment are omitted.

Figure 10:
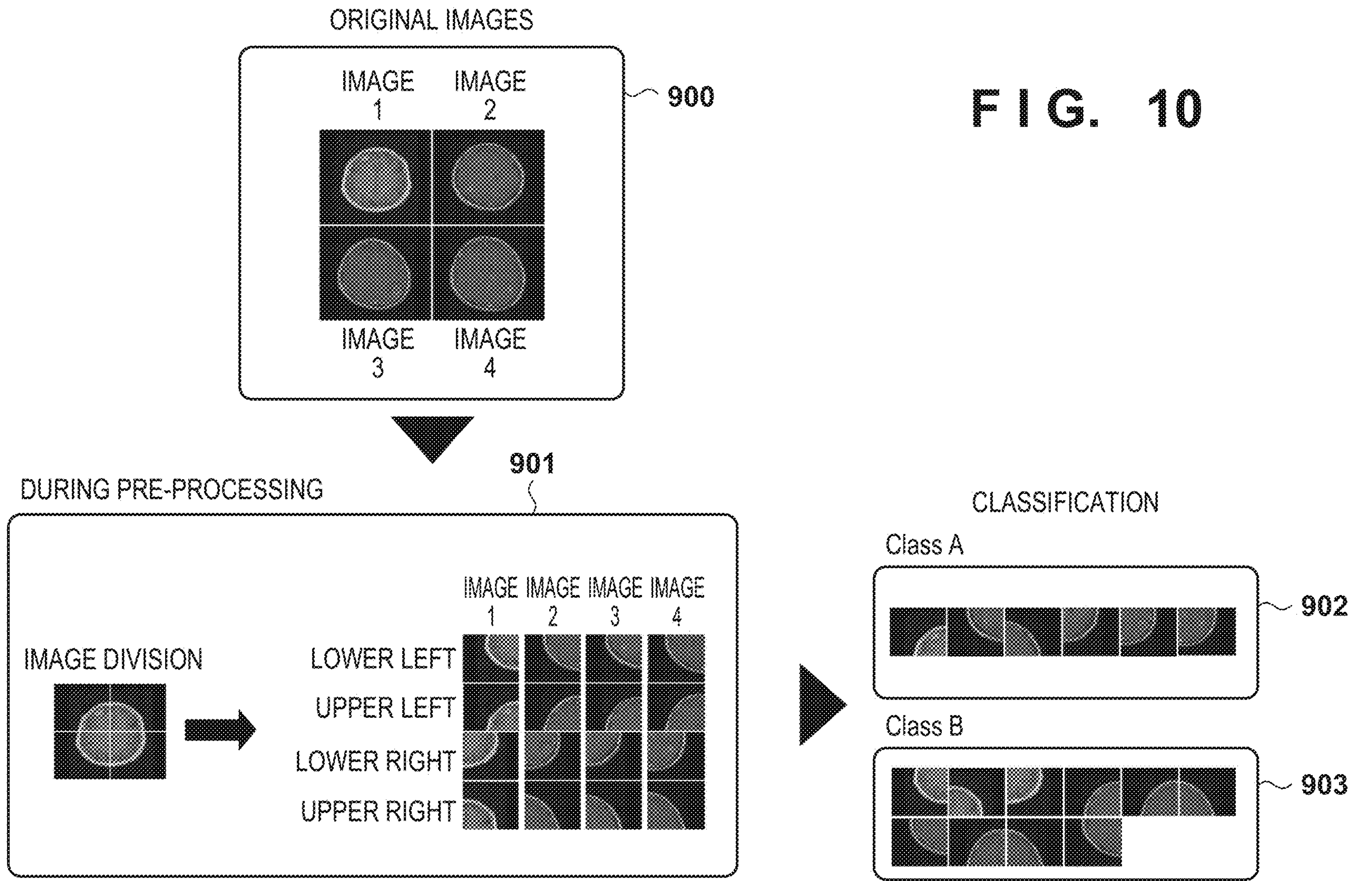
FIG. 10 is a diagram showing the details of processing performed before learning in a second embodiment.

The present embodiment is different from the first embodiment, in which an abnormal portion is present at a central portion of a captured image, in that an abnormal portion can be present at any position of a captured image of a subject of inspection. Here, it is assumed that MRI images are used as an example of the captured image of a subject of inspection in which the position of an abnormal portion is indeterminate. FIG. 10 shows an example of original images 900. In the present embodiment, the resolution of the original images 900 is 600×600 pixels, and the horizontal and vertical sizes of the abnormal portion are several pixels to several tens of pixels.

In the first embodiment, each original image is captured such that an abnormal portion is located at a central portion of the original image. Accordingly, when generating training images from each original image 900, in addition to four partial images obtained by equally dividing the original image 900 in the vertical and horizontal directions, one partial image was extracted from the central portion.

In contrast, in the present embodiment, abnormal portions are present at various positions within the original images, and therefore no image is extracted from the central portion. Accordingly, as shown in FIG. 10, each original image 900 is divided by pre-processing, thus generating partial images 901. FIG. 10 shows an example of pre-processing in which each original image 900 is equally divided into two in the horizontal and vertical directions, thus generating four partial images 901 of 300×300 pixels.

Figure 11A:
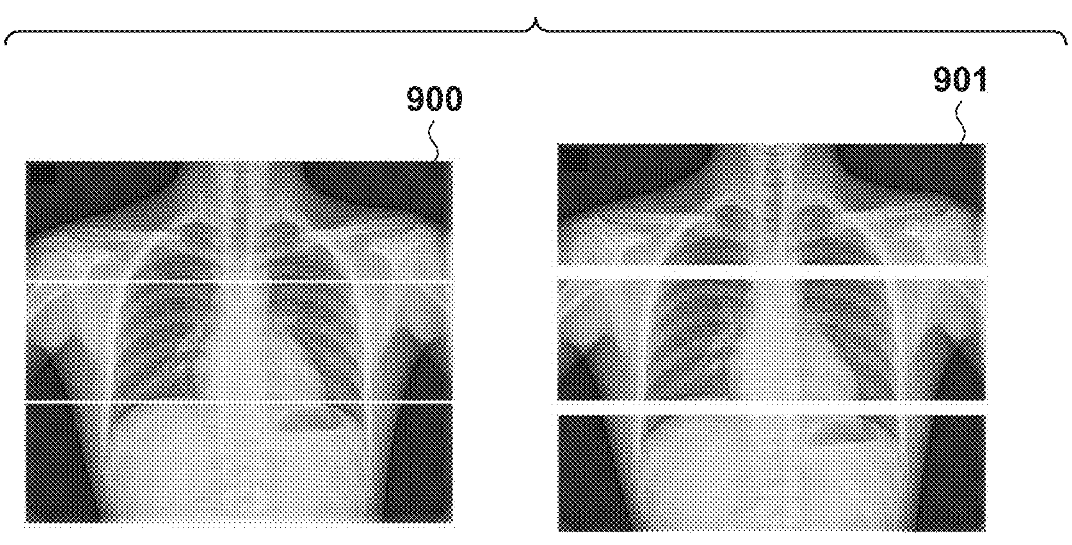
FIGS. 11A and 11B are diagrams showing an image dividing method.
Figure 11B:
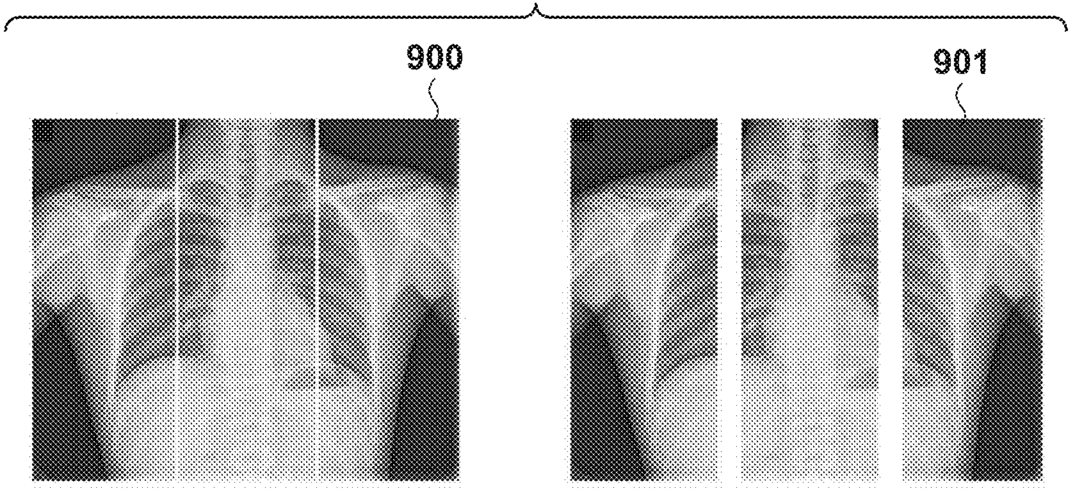

Note that the partial images 901 may be generated by dividing each original image 900 in one of the horizontal and vertical directions. FIG. 11A shows an example of pre-processing in which partial images 901 are generated by dividing an original image 900 into three only in the vertical direction. FIG. 11B shows an example of pre-processing in which partial images 901 are generated by dividing an original image 900 into three only in the horizontal direction.

In the present embodiment as well, the proportion of a subject of detection (e.g., an abnormal portion) to the entire image can be increased by generating a plurality of partial images from each original image 900, and using the images as the training images. In addition, it is possible to efficiently learn a subject of detection whose position in the image is indeterminate. As a result, it is possible to increase the recognition accuracy for the subject of detection.

Here, through deduction processing using the learned model 352, the input data is classified into data containing an abnormality, and data containing no abnormality. Accordingly, a correct classification for each individual partial image 901 is prepared as teaching data. Specifically, as shown in FIG. 10, the teaching data was generated by classifying the partial images 901, through visual checking performed by a person, such that images 902 in which an abnormality to be recognized is present are classified as class A, and (normal) images 903 in which an abnormality to be recognized is not present are classified as class B.

Here, for the ease of illustration and understanding, the input data is described as being classified into two classes through deduction processing. However, the input data may be classified into three or more classes. The classes may be defined according to the criteria other than the presence or absence of an abnormality to be recognized. The teaching data may be generated by a method other than visual checking. For example, a simple learning model based on visually checked images may be created, and teaching data for partial images may be generated using the simple learning model.

Using the thus generated input data (partial images 901) and teaching data, the learning model 252 is learned in the same manner as in the first embodiment, and the learned learning model 252 is supplied to the edge server 300 as the learned model 352.

Thereafter, the test images 904 are supplied to the learned model 352 as the input data 811, and the determined classes are obtained as output data. Note that the in the present embodiment, test images 904 are generated in the same manner as the training images (partial images 901).

Figure 12:
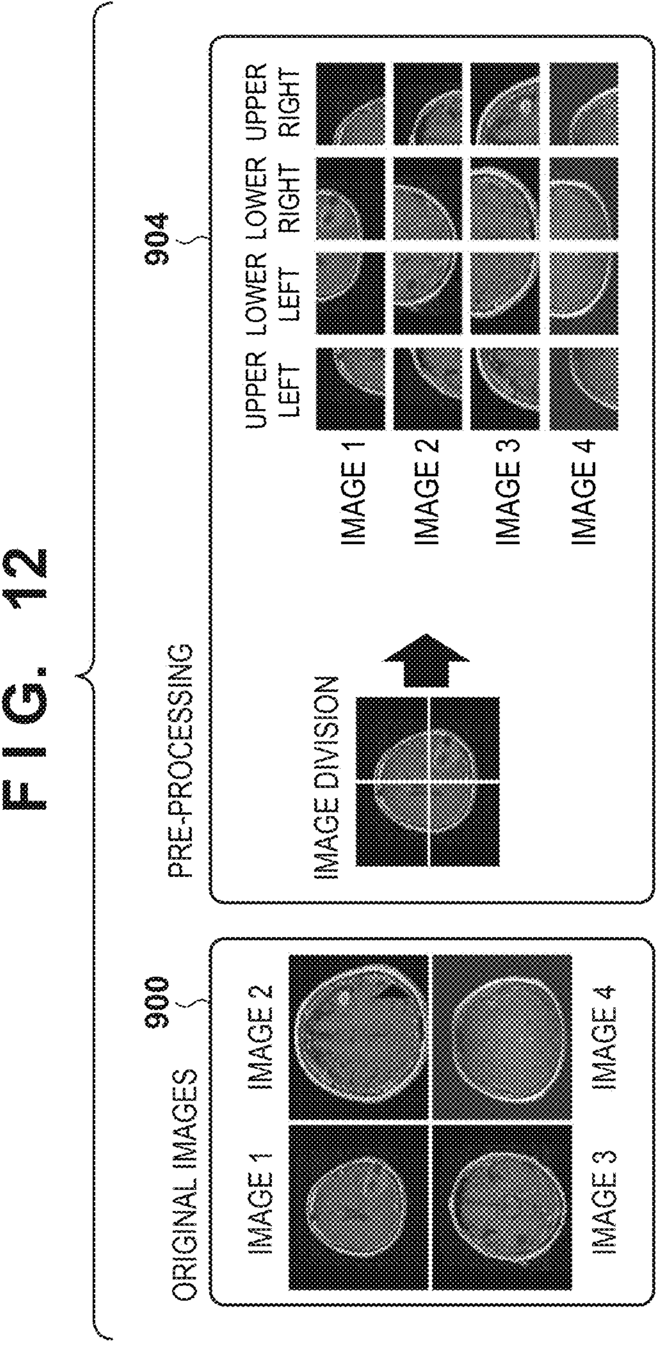
FIG. 12 is a diagram showing the details of test image processing in the second embodiment.

FIG. 12 shows an example of the original images 900 for determining the presence or absence of an abnormality using the learned model 352. Through pre-processing, the deduction unit 351 generates, as test images 904, partial images obtained by equally dividing each of the original images 900 into two in the horizontal and vertical directions. The deduction unit 351 supplies the generated test images 904 to the learned model 352 as the input data 811.

In the present embodiment, a plurality of test images are generated from one original image, unlike the first embodiment. Accordingly, if one or more of a plurality of the test images generated from the same original image are classified as class A using the learned model 352, it is determined that an abnormality has been detected from the original image.

Using the learned model according to the present embodiment, and a learned model that has been learned by a conventional method in which original images are directly used, the determination accuracies thereof were compared. As a result, it was confirmed that the learned model according to the present embodiment has a higher determination accuracy.

Third Embodiment

Next, a third embodiment will be described. Note that the present embodiment can be implemented in the image processing system 100 described in the first embodiment, and therefore the descriptions of details common to the first embodiment are omitted. It is assumed that the same MRI images as those used in the second embodiment are used in the present embodiment. The following description is focused on the differences from the second embodiment.

Figure 13:
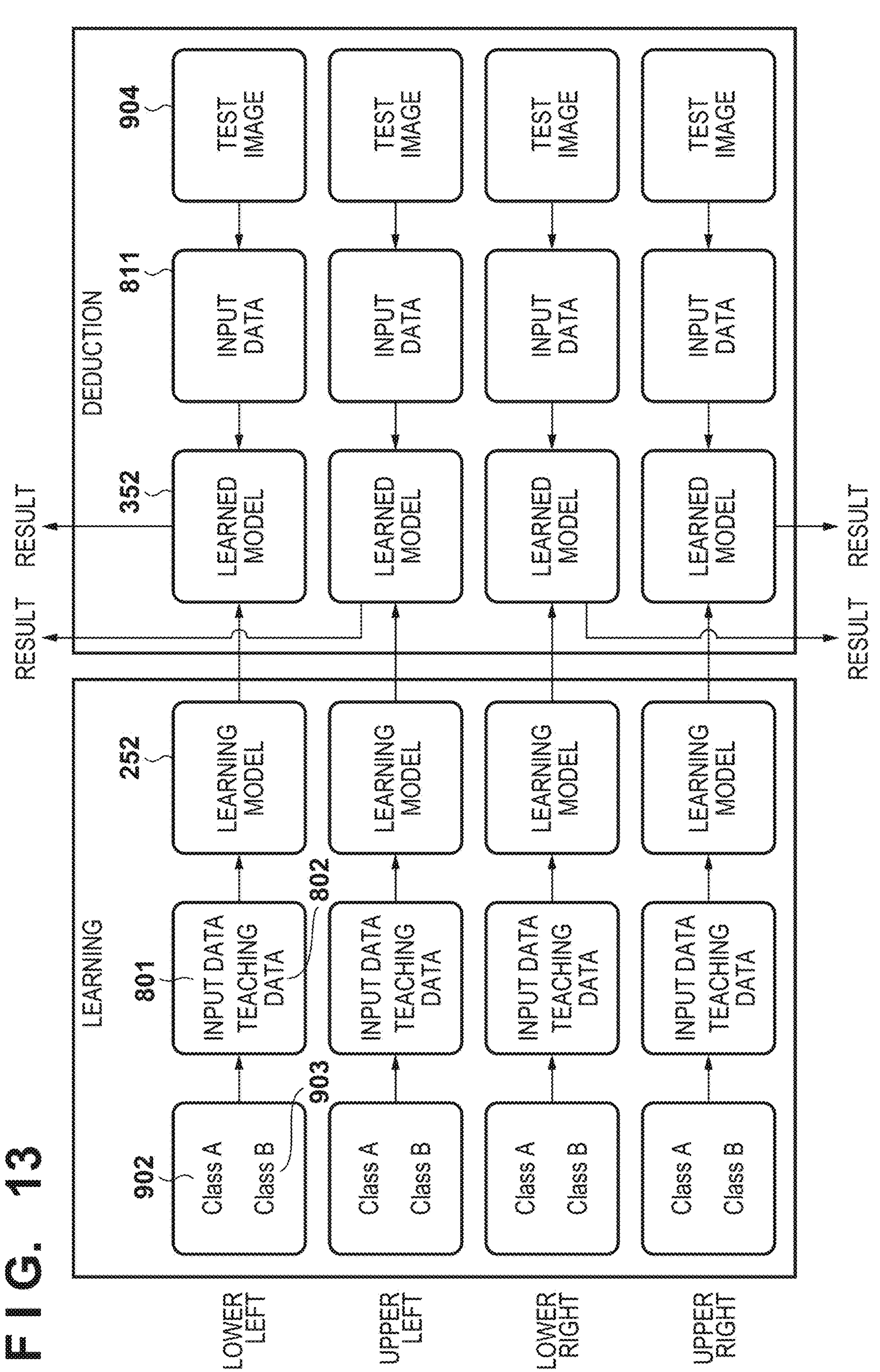
FIG. 13 is a diagram showing configurations used during learning and deduction in a third embodiment.

FIG. 13 is a diagram schematically showing a flow of learning processing and deduction processing performed in the image processing system 100 according to the present embodiment, and associated data, similarly to FIG. 8. As shown in FIG. 13, in the present embodiment, a separate learning model is used for each region into which original images have been divided.

In FIG. 14, original images 900 and pre-processing for generating partial images 901 from the original images 900 are the same as those in the second embodiment. Thereafter, for each group of partial images 901 of the same position (for each region of the original images), an image 902 in which an abnormality to be recognized is present is classified as class A, and a (normal) image 903 in which an abnormality to be recognized is not present is classified as class B, thus generating teaching data. Specifically, as shown in FIG. 14, teaching data is generated by classifying the partial images 901 into class A and class B, separately for lower-left partial images 907, upper-left partial images 908, lower-right partial images 909, and upper-right partial images 910.

For each region into which the original images have been divided, the data transmission/reception unit 451 of the device 400 supplies, to the learning data generation unit 250, the class-A images 902 and the class-B images 903, and teaching data as needed. For each region into which the original images have been divided, the learning data generation unit 250 generates input data 801 and teaching data 802 as training data, and supplies the training data to the learning unit 251.

The learning unit 251 performs learning of each individual learning model 252 using the training data, and ends the learning when the deviation amount L indicated by the loss function falls below a predetermined threshold. At this time, the learning model 252 becomes a learned model. Then, a whole or part of the learning model 252 is supplied to the edge server 300, and is saved as a learned model 352. Note that at least one of the learning data generation unit 250 and the learning unit 251 may also be provided for each type of partial image as in the case of the learning model 252.

The generation of the test images 904 and the input data 811 is the same as that in the second embodiment. In the second embodiment, the input data 811 is input to one learned model 352. In the present embodiment, four pieces of input data 811 respectively corresponding to the lower-left, upper-left, lower-right, upper-right test images 904 are input to the respective corresponding learned models 352.

From the four learned models 352, a determination result for each of the four regions obtained by dividing one original image is obtained. From the four determination results, the deduction unit 351 obtains a determination result for the original image. For example, the deduction unit 351 determines that an abnormality is present in the original image, if even one of the four determination results indicates the presence of an abnormality.

The present embodiment can also achieve the same effect as that of the second embodiment. By using a learning model for each region into which the original images have been divided, the noise between the regions becomes smaller than that in the case of using one learning model, and the determination accuracy is improved.

Using the learned model according to the present embodiment, and a learned model that has been learned by a conventional method in which original images are directly used, the determination accuracies thereof were compared. As a result, it was confirmed that the learned model according to the present embodiment has a higher determination accuracy.

Other Embodiments

In each of the above-described embodiments, a configuration using one type of learning model is described. However, learning and deduction may be performed using, in parallel, a plurality of learning models that differ in the size of images used and the configuration. The final deduction result can be obtained by ensemble determination, for example.

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-034666, which was filed on Mar. 4, 2021 and which is hereby incorporated by reference herein in its entirety.

What is claimed is:

1. An image processing apparatus for detecting an abnormality from inspection images of a semiconductor substrate, comprising:

one or more processors, including a Graphics Processing Unit (GPU), that execute a program stored in a memory and thereby function as:

a generation unit configured to generate training data of at least one learning model from first original images obtained by capturing a semiconductor substrate, wherein an abnormal portion is captured in each of the first original images, wherein the generation unit generates as a plurality of partial images, from each of the first original images, (i) non-overlapped four partial images by dividing the first original image along vertical and horizontal lines that orthogonally intersect at a center of the first original image and (ii) another partial image overlapping with the four partial images by extracting a central portion of the first original image so that a center of the other partial image coincides with the center of the first original image and such that the abnormal portion is located in a peripheral portion of at least two partial images of the plurality of partial images, and wherein the generation unit generates the training data using the plurality of partial images;

a learning unit configured to apply a learning process to the at least one learning model using the training data; and a deduction unit configured to perform, using the learned at least one learning model, deduction processing of detecting an abnormality from one or more inspection images of a semiconductor substrate by inputting input data generated from a second original image obtained by capturing the semiconductor substrate into the at least one learning model to detect abnormality in the input data generated from the second original image.

2. The image processing apparatus according to claim 1, wherein the deduction unit uses a partial image of the second original image as the input data.

3. The image processing apparatus according to claim 2, wherein the image processing apparatus comprises a plurality of devices that are communicably connected, and wherein the learning unit and the deduction unit are provided in separate devices.

4. The image processing apparatus according to claim 3, wherein a device that supplies the first original images and the second original image is a device separate from the devices in which the learning unit and the deduction unit are provided.

5. The image processing apparatus according to claim 3, wherein the learning unit supplies, to the device in which the deduction unit is provided, a part or whole of the at least one learning model for which the learning has been completed, and wherein the deduction unit uses, as the learned at least one learning model, the at least one learning model supplied from the learning unit.

6. The image processing apparatus according to claim 1, wherein the deduction unit uses, as the input data, a partial image obtained by extracting a central portion of the second original image in the same manner as a central portion of the first original image is extracted.

7. The image processing apparatus according to claim 1, wherein the at least one learning model is a single leaning model.

8. An image processing method performed by an image processing apparatus for detecting an abnormality from inspection images of a semiconductor substrate, the image processing method comprising:

generating training data of at least one learning model from first original images obtained by capturing a semiconductor substrate, wherein generating the training data includes:

generating as a plurality of partial images, from each of the first original images in which an abnormal portion is captured, (i) non-overlapped four partial images by dividing the first original image along vertical and horizontal lines that orthogonally intersect at a center of the first original image and (ii) another partial image overlapping with the four partial image by extracting a central portion of the first original image so that a center of the other partial image coincides with the center of the first original image and such that the abnormal portion is located in a peripheral portion of at least two partial images of the plurality of partial images, and generating the training data using the plurality of partial images;

applying a learning process to the at least one learning model using the training data; and performing, using the learned at least one learning model, deduction processing of detecting an abnormality from one or more inspection images of a semiconductor substrate by inputting input data generated from a second original image obtained by capturing the semiconductor substrate into the at least one learning model to detect abnormality in the input data generated from the second original image.

9. The image processing method according to claim 8, wherein, in the performing of deduction processing, a partial image of the second original image is used as the input data.

10. A non-transitory computer-readable storage medium storing a program for causing a computer to perform an image processing method for detecting an abnormality from inspection images of a semiconductor substrate, comprising:

generating training data of at least one learning model from first original images obtained by capturing a semiconductor substrate, wherein generating the training data includes:

generating as a plurality of partial images, from each of the first original images in which an abnormal portion is captured, (i) non-overlapped four partial images by dividing the first original image along vertical and horizontal lines that orthogonally intersect at a center of the first original image and (ii) another partial image overlapping with the four partial images by extracting a central portion of the first original image so that a center of the other partial image coincides with the center of the first original image and such that the abnormal portion is located in a peripheral portion of at least two partial images of the plurality of partial images, and generating the training data using the plurality of partial images;

applying a learning process to the at least one learning model using the training data; and performing, using the learned at least one learning model, deduction processing of detecting an abnormality from one or more inspection images of a semiconductor substrate by inputting input data generated from a second original image obtained by capturing the semiconductor substrate into the at least one learning model to detect abnormality in the input data generated from the second original image.

* * * * *